United States Patent
Misra et al.

(10) Patent No.: US 9,626,254 B2
(45) Date of Patent: Apr. 18, 2017

(54) BACKUP AND NON-STAGED RECOVERY OF VIRTUAL ENVIRONMENT DATA

(71) Applicant: Hewlett-Packard Development Company, L.P., Houston, TX (US)

(72) Inventors: Shishir Misra, Karnataka (IN);
Pradeep Ganapathy, Karnataka (IN);
Balasubramaniyam L, Karnataka (IN);
Tejaswini K N, Karnataka (IN);
Mandar Nanivadekar, Karnataka (IN);
Rohan A Kulkarni, Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 162 days.

(21) Appl. No.: 14/461,717

(22) Filed: Aug. 18, 2014

(65) Prior Publication Data
US 2015/0378833 A1  Dec. 31, 2015

(30) Foreign Application Priority Data
Jun. 26, 2014 (IN) .......................... 3126/CHE/2014

(51) Int. Cl.
*G06F 11/14* (2006.01)
*G06F 9/455* (2006.01)

(52) U.S. Cl.
CPC ...... *G06F 11/1469* (2013.01); *G06F 11/1448* (2013.01); *G06F 11/1446* (2013.01); *G06F 11/1458* (2013.01); *G06F 2009/45575* (2013.01); *G06F 2201/815* (2013.01)

(58) Field of Classification Search
CPC ............. G06F 11/1446; G06F 11/1471; G06F 11/1448; G06F 11/1451; G06F 11/1458; G06F 209/45558; G06F 209/45575
See application file for complete search history.

(56) References Cited

U.S. PATENT DOCUMENTS

| | | | |
|---|---|---|---|
| 8,453,141 B1 * | 5/2013 | Poole | ........................ G06F 8/68 717/169 |
| 8,566,640 B2 | 10/2013 | Timashev et al. | |

(Continued)

OTHER PUBLICATIONS

Oracle Database Secure Files and Large Objects Developers Guide May 2008 section 1: Introduction to Large Objects https://web.archive.org/web/20130922230153/http://docs.oracle.com/cd/B28359_01/appdev.111/b28393.pdf.*

(Continued)

*Primary Examiner* — Joseph Schell
(74) *Attorney, Agent, or Firm* — Hewlett Packard Enterprise Patent Department

(57) ABSTRACT

Methods for creating backup of data of a virtual environment to allow non-staged recovery are described. The described method may include receiving data of a virtual environment through one or more data streams for backup. The method also includes generating metadata corresponding to the received data and storing the received data at a first location of a backup storage unit. Further, the method includes storing the generated metadata at a second location of the backup storage unit, where the second location is different from the first location of the backup storage unit. The method further includes mapping the at least one predefined file to the stored data to create a mapping table to allow direct access to the stored data for non-staged recovery.

20 Claims, 4 Drawing Sheets

(56) References Cited

U.S. PATENT DOCUMENTS

| | | | |
|---|---|---|---|
| 8,732,417 B1* | 5/2014 | Stringham | G06F 11/1448 711/162 |
| 8,751,515 B1* | 6/2014 | Xing | G06F 17/30073 707/755 |
| 2012/0144391 A1* | 6/2012 | Ueda | G06F 9/45558 718/1 |
| 2012/0311002 A1* | 12/2012 | Akagawa | G06F 17/302 707/827 |
| 2013/0036418 A1 | 2/2013 | Yadappanavar et al. | |
| 2013/0061014 A1* | 3/2013 | Prahlad | G06F 11/1453 711/162 |

OTHER PUBLICATIONS

File Level Restore,http://www.altaro.com/manuals/Altaro-Hyper-V-Backup/V4-0/HTM/Altaro-Hyper-VBackup-UserGuide.html?FileLevelRestore.html,Jan. 7, 2014.

Pisal, C., Licensing Syamatec Netbackup Client (7.x) for Virtualized Environment,http://virtechgeek.com/2013/06/16/licensing-syamatec-netbackup-client-for-virtualizatioon-environment/, Jun. 16, 2013.

\* cited by examiner

BACKUP AND NON-STAGED RECOVERY OF VIRTUAL ENVIRONMENT DATA

BACKGROUND

Computing systems, and their components, are subject to various failures which may result in the loss of data. In order to mitigate the risk of data loss due to hardware failures, or any other unforeseen and unavoidable circumstances, organizations rely on backup solutions to maintain organization's data and application ready for recovery.

In today's growing business demands, use of virtual environment has become common for hosting different applications and services, and processing different data in different formats. Likewise, backup of virtual environments is also undertaken by organizations to ensure availability of the virtual machines (VMs) at all times.

BRIEF DESCRIPTION OF DRAWINGS

The detailed description is provided with reference to the accompanying figures. In the figures, the left-most digit(s) of a reference number identifies the figure in which the reference number first appears. The same numbers are used throughout the drawings to reference like features and components.

DETAILED DESCRIPTION

Figure 1A:
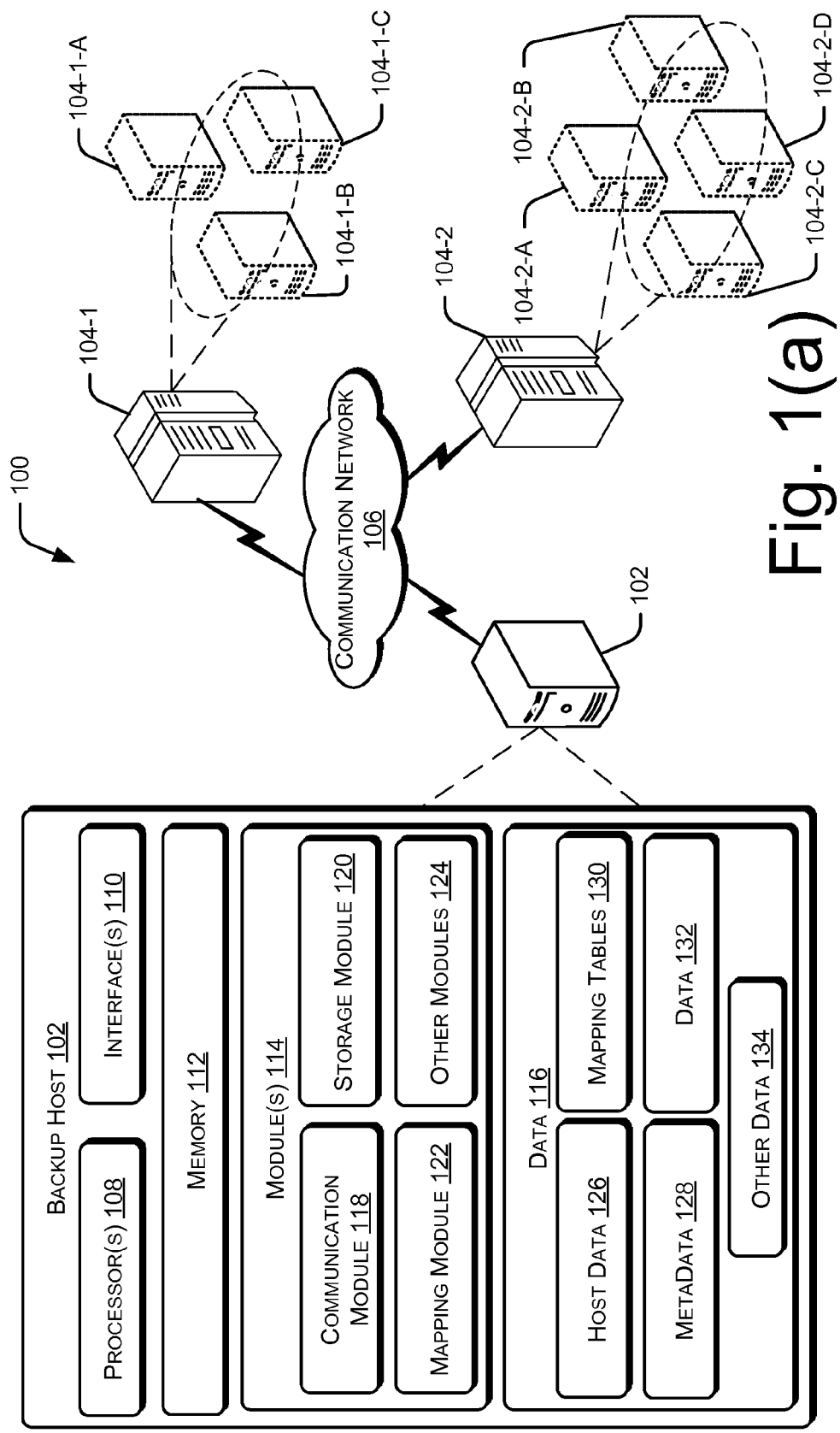
FIG. 1(a) illustrates a computing environment implementing a backup host for backup of virtual environment data, according to an example of the present subject matter.

The present subject matter relates to systems and methods for creating backups of virtual environments to allow non-staged granular recovery of data and files. Over a period of time, due to increase in hardware capabilities of computing devices, and increase in demand of different services, use of virtual environments has become widespread among organizations and service providers. Generally, a virtual environment may include multiple virtual machines (VMs) operating to provide different functionalities based on their configuration and capabilities. Each VM may include data which it may store and operate on, such as files and documents. Further, the VM may also include configuration data which may define VM's configuration of capabilities. For the sake of explanation, data which may be stored by the VM along with the configuration data of the VM may be commonly be referred to as VM's data.

Backup of virtual environments allows recovery of such VMs and prevent outages, regardless of whether the failure results from corruption, common place errors, or large-scale disasters. Known techniques of backup recovery generally restore entire backed-up VM's data and provide it to hypervisors or virtualization agents. The virtualization agents may then enable a user to browse through the backed-up VM's data and select particular files for restoration. Usually, few files or directories are desired by users for recovery while the other files, such as Operating System (OS) files can be recovered from templates, rather than from backed-up data.

Therefore, for the recovery of even a single file of few kilobytes in size, from a VM which may be of few terabytes in size, the entire VM data is restored into a temporary 'staging area' and is then utilized by the virtualization agents to enable the user to browse and select the files for restoration. Since, a full recovery of VM's data is generally not desired, restoring of the entire VM's backed-up data leads to enormous wastage of storage space, time, and computing resources for recovery of few files or directories.

Moreover, backup applications which provide backup functionality to the virtualization agents, interleave the data with some metadata prior to backup. To allow recovery of data interleaved with the metadata, the data is generally temporarily staged which again leads to wastage of storage space, time, and computing resources.

According to example implementations of the present subject matter, systems and methods for creating backups of virtual environments to allow non-staged granular recovery of data and files are described. The described method and systems may also allow utilization of backed-up data in a format such that granular recovery of data can be performed. Therefore, the described systems implement methods which on one hand allow non-staged granular recovery of data and files without restoring entire VM's backed-up data, on the other hand, makes data of the VM available as binary large objects for numerous other usages, such as direct storage onto databases.

The described systems and methods may be implemented in various computing devices which either implement virtual environments, or are connected to computing devices implementing virtual environments, through one or more networks. For the sake of explanation, computing devices which utilize virtualization agents to provide virtual environments including one or more VMs may be referred to as computing hosts, hereinafter. Further, computing devices providing backup capability for the virtual environments to allow non-staged granular recovery of data may be referred to as backup hosts, hereinafter.

In an example implementation of the present subject matter, the computing host may utilize virtualization agent, such as the vmware® to provide the VMs, or the virtual platforms. For the purpose of backup, the virtualization agent may provide VM's data to the backup host through the network in the form of data streams.

Upon receiving the stream of data, the backup host may generate metadata corresponding to the data streams. The metadata can be understood as data representing information about the data being backed-up which may be utilized for various purposes, such as to provide catalog of backed-up data and to provide housekeeping functions. For example, the metadata may include, but not limited to, descriptors, references, file sizes, checksum of the data, disk information, and time of backup of the data.

To allow non-staged recovery of the data, the backup host may store the data received through the data stream, onto a first location of a backup storage unit. In one example, the backup storage unit may be a local storage of the backup host, such as a disk storage or hard disk. In another example, the backup storage unit may be a storage unit connected through a network, such as a storage area network (SAN) and Network Access Storage (NAS).

Further, in an example implementation of the present subject matter, the backup host may also store the generated metadata onto a second location of the backup storage unit. The second location of the backup storage unit may either be a different path or folder from the first location, within the backup storage unit to separate the metadata and the data.

Since the data is stored as a backup without being interleaved with metadata, restoration of the backed-up data onto a staging area to first separate metadata from the data may not be necessitated, and the data may directly be provided to the virtualization agents for granular recovery. In other words, the separate storage of the data and the metadata may allow the backup system to directly provide the data to the virtualization agents for non-staged recovery.

While creating backup for a virtual environment, data corresponding to multiple VMs may be backed-up by the backup host. Therefore, for the purpose of recovery of a particular VM's data, the virtualization agent may request for predefined files associated with the particular VM.

In one example implementation of the present subject matter, the backup host may create a mapping between such predefined files and the data of the VM, stored at the first location. The mapping between the predefined files and the data of the VM may allow the virtualization agents to directly access the data, corresponding to the particular VM, by selecting the predefined files. Thus, the non-staged recovery of the data may be made without any restoration of the entire VM's data.

The above mentioned systems and methods are further described with reference to FIG. 1(a), FIG. 1(b), FIG. 2, and FIG. 3. It should be noted that the description and figures merely illustrate the principles of the present subject matter along with examples described herein and, should not be construed as a limitation to the present subject matter. It is thus understood that various arrangements may be devised that, although not explicitly described or shown herein, embody the principles of the present subject matter. Moreover, all statements herein reciting principles, aspects, and specific examples thereof, are intended to encompass equivalents thereof.

FIG. 1 (a) schematically illustrates a computing environment 100, implementing a backup host 102, according to an example implementation of the present subject matter. The computing environment 100 may include computing hosts 104-1 and 104-2 coupled to the backup host 102 through a communication network 106. For the sake of explanation, the computing hosts 104-1 and 104-2 may be commonly referred to as computing hosts 104 and individually referred to as computing host 104, hereinafter.

According to an example implementation of the present subject matter, the backup host 102 may be implemented as, but is not limited to, a server, a workstation, a computer, and the like. The backup host 102 may be a machine readable instructions-based implementation or a hardware-based implementation or a combination thereof. The backup host 102, although shown to be a computing device communicatively coupled to the computing hosts 104 through the communication network 106, could also be implemented with each of the computing host 104, albeit a few variations.

The computing hosts 104 may include, but are not restricted to, desktop computers, servers, laptops, and the like. Each of the computing host 104 may utilize a hypervisor, or a virtualization agent, such as vmware® (not shown) to create a virtual environment. Each virtual environment may include one or more virtual machines (VMs). In an example, the virtual environment of the computing host 104-1 may include three VMs 104-1-A, 104-1-B, and 104-1-C. Similarly, the virtual environment of the computing host 104-2 may include four VMs 104-2-A, 104-2-B, 104-2-C, and 104-2-D.

Each VM of the virtual environment can be understood as a virtual emulation of the computing host 104, capable of providing functionalities based on predefined configuration by commonly utilizing the hardware capabilities of the computing host 104. The computing capabilities of each of the VM may either be equal to that of the computing host 104, or may be a subset of the computing capabilities of computing host 104, and may be preconfigured depending on the requisite of the functionalities of each VM. Therefore, the VMs within each virtual environment may include different capabilities and may accordingly include different set of data.

For example, the VM 104-1-A may provide web hosting services while the VM 104-2-D may provide capabilities of big data analysis and storage. Accordingly, the VM 104-1-A may include applications such as apache™ to support the functionality of web hosting, and the VM 104-2-D may include applications such as hadoop® to support big data analysis.

The backup host 102 may be communicatively coupled to the computing hosts 104 over the communication network 106 through one or more communication links. The communication links between the backup host 102 and the computing hosts 104 may be enabled through any desired form of communication, for example, via dial-up modem connections, cable links, digital subscriber lines (DSL), wireless or satellite links, or any other suitable form of communication.

Further, the communication network 106 may be a wireless network, a wired network, or a combination thereof. The communication network 106 can also be an individual network or a collection of many such individual networks, interconnected with each other and functioning as a single large network, e.g., the Internet or an intranet. The communication network 106 can be implemented as one of the different types of networks, such as intranet, local area network (LAN), wide area network (WAN), and such. The communication network 106 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other.

The communication network 106 may also include individual networks, such as but not limited to, Global System for Communication (GSM) network, Universal Telecommunications System (UMTS) network, Long Term Evolution (LTE) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the implementation, the communication network 106 may include various network entities, such as base stations, gateways and routers; however, such details have been omitted to maintain the brevity of the description. Further, it may be understood that the communication between the backup host 102, the computing host 104, and other entities may take place based on the communication protocol compatible with the communication network 106.

In an example implementation of the present subject matter, the computing host 104 and the backup host 102 may be different computing devices connected through the communication network 106. The backup host may either store the backed-up data locally, or may store the data on to an external backup storage unit connected to the backup host through the communication network 106. In another example implementation of the present subject matter, it may also occur that the capability of computing host 104 for providing virtual environments along with capability of backup host 102 for providing non-staged granular recovery of data may be provided by a single computing device, such as the computing host 104.

Although the description herein is with reference to backup hosts 102 communicatively coupled to computing hosts 104 over the communication network 106, the methods and described techniques may be implemented in other arrangements, albeit with a few variations.

In an example implementation, the backup host 102 may include processor(s) 108. The processor(s) 108 may be implemented as microprocessors, microcomputers, microcontrollers, digital signal processors, central processing units, state machines, logic circuitries, and/or any devices that manipulate signals based on operational instructions. Among other capabilities, the processor(s) 108 may fetch and execute computer-readable instructions stored in a memory. The functions of the various elements shown in the figure, including any functional blocks labeled as "processor(s)", may be provided through the use of dedicated hardware as well as hardware capable of executing machine readable instructions.

The backup host 102 also includes interface(s) 110. The interface(s) 110 may include a variety of machine readable instructions-based interfaces and hardware interfaces that allow the backup host 102 to interact with the computing hosts 104. Further, the interface(s) 110 may enable the backup host 102 to communicate with other communication and computing devices, such as network entities, web servers and external repositories.

Further, the backup host 102 includes memory 112, coupled to the processor(s) 108. The memory 112 may include any computer-readable medium including, for example, volatile memory (e.g., RAM), and/or non-volatile memory (e.g., EPROM, flash memory, Memristor, etc.).

Further, the backup host 102 includes module(s) 114 and data 116. The module(s) 114 may be coupled to the processor(s) 108. The module(s) 114, amongst other things, include routines, programs, objects, components, data structures, and the like, which perform particular tasks or implement particular abstract data types. The module(s) 114 further include modules that supplement applications on the backup host 102, for example, modules of an operating system. The data 116 serves, amongst other things, as a repository, or a backup storage unit for storing data that may be fetched, processed, received, or generated by the module(s) 114, and received from the computing hosts 104 for the purpose of backup. Although the data 116 is shown internal to the backup host 102, it may be understood that the data 116 can reside in an external backup storage unit (not shown in the figure), such as SAN and Network-attached storage (NAS) which may be coupled to the backup host 102. The backup host 102 may communicate with the external backup storage unit through the interface(s) 110 to obtain information from the data 116.

In an example implementation, the module(s) 114 of the backup host 102 may include a communication module 118, a storage module 120, a mapping module 122, and other module(s) 124. In an implementation, the data 116 of the backup host 102 includes host data 126, metadata 128, Mapping tables 130, data 132, and other data 134. The other module(s) 124 may include programs or coded instructions that supplement applications and functions, for example, programs in the operating system of the backup host 102, and the other data 134 fetched, processed, received, or generated by the other module(s) 124.

The following description describes the backup host 102 providing backup of data of VMs running on computing host 104 to enable non-staged granular recovery of data and files, in accordance with the present subject matter. It would be understood that the described examples and implementation are for the purpose of explanation, and shall not be construed as specific implementation of the present subject matter.

In one example implementation of the present subject matter, the computing hosts 104 may backup their virtual environments and store its data after regular intervals of time period, for future recovery by the backup host 102. Alternatively, the backup of the virtual environments of the computing hosts 104 may be triggered by a user and may not be based on a predefined scheduled backup defined onto the computing hosts 104.

To this end, the communication module 118 of the backup host 102 may receive data to be backed-up from the computing hosts 104. Since the virtual environments in each computing host 104 may be provided by a hypervisor or a virtualization agent, such hypervisor or virtualization agent may also provide the data of the virtual environments to the backup host 102. The data provided by the virtualization agents to backup a virtual environment may include multiple files. A sub-set of such files may correspond to data of one VM while another sub-set of such files may correspond to data of another VM.

For example, the virtualization agent may provide data to the communication module 118 for backup of a virtual environment with 4 VMs. The data may include 18 files, where a sub-set of 5 of such files may correspond to data of $1^{st}$ VM, another sub-set of 3 of such files may correspond to data of $2^{nd}$ VM, another sub-set of 6 of such files may correspond to data of $3^{rd}$ VM, and final sub-set of remaining 4 of such files may correspond to data of the $4^{th}$ VM. In an example of the present subject matter, the communication module 118 may receive the data to be backed-up through data streams from the virtualization agents.

Upon receiving the data through the data streams, the storage module 120 may generate metadata 128 corresponding to the data. The metadata 128 may include information about the data such that the information can be used for further processing. The metadata 128 corresponding to the data may include information, but not limited by, descriptors, references, file sizes, disk information, checksum of the data, user privileges, time stamp of backup, and the like. In one example, the metadata 128 corresponding to the data to be backed-up may also provide information about number of disks included in each VM, size of each disk included in the VM, type of backup, user details who initiates the backup, etc.

In one example implementation, the storage module 120 may store the data received by the communication module 118 at a first location in the backup storage unit, as the data 132. The data may be stored as binary copies of source files. Since the data being stored by the storage module 120 includes multiple files and the data is stored as binary copies of source files, each file within the data is also stored as binary large objects (blobs), and is referred to as blobs hereinafter.

The first location defined by the storage module 120 may either be a predefined path within the backup storage unit, or may be a predefined folder within the backup storage unit.

For example, the storage module 120 may store the data received from the computing hosts 104 at a predefined path, say <BACKUP_PATH>. Therefore, the storage module 120 may send the data that it backs up to the <BACKUP_PATH> path. Examples of the <BACKUP_PATH> may include "c:\backup\", "/backup/", etc.

In one example, the storage module 120 may define the path or the folder corresponding to the first location at which the data is to be stored based on the computing host from which the data is received. In such situations, the path of storage may be defined as "\\Computinghostname\backup". For instance, if the data from the computing host 104-2 is to be stored, the path chosen by the storage module 120 may be "\\104-2\backup\".

As described earlier, the backup host 102 may support backup through changed block tracking mechanisms. Therefore, in case if the virtualization agent supports changed block tracking mechanisms where storage of changed blocks is performed, the data received by the communication module 118 may include such changed blocks for storage. For example, a VM with an associated disk of 100 GB may merely have about 20 to 30 GB of used disk space. Accordingly, when data of such a VM is received for backup through the changed block method, merely the changed blocks may be received by the communication module 118 along with mapping information of their placement in disk.

In such situations, according to an implementation of the present subject matter, the storage module 120 may create thinly-distributed files based on received list of changed blocks and the mapping information for the purpose of backup. The storage module 120 may then store the created thinly-distributed file at the first location within the backup storage unit. Also, the mapping information along with information about offset for the changed blocks may be stored with the metadata 128, by the storage module 120.

Upon storage of the data at the first location, the storage module 120 may also store the metadata 128 generated corresponding to the data at a second location in the backup storage unit. The second location may either be a predefined path within the backup storage unit, or may be a predefined folder within the backup storage unit. In an implementation of the present subject matter, the second location may be different from the first location of the backup storage unit utilized for the storage of the data 132. Therefore, the storage module 120 may store the data 132 and the metadata 128 at different locations within the backup storage unit without any interleaving between the two.

It would be noted that the backed-up data of a virtual environment, stored by the storage module 120, includes multiple blobs where sub-sets of such blobs may correspond to different VMs of a virtual environment. In one implementation of the present subject matter, the storage module 120 may store the blobs with random names. The storage of blobs with random names may prevent naming collisions between similar blobs from multiple sources, such as for different VMs. For example, if a virtual environment includes two VMs and both of such VMs are mapped to one disk each, the file corresponding to each VM for their mapped disk may have similar name "\\C:\". Blobs corresponding to such files, if named based on their source file may create name collision and therefore, the storage module 120 may store the blobs with random names.

In one example, the name of backed up blob file may be a 32 character long alphanumeric value. For instance, one blob may be named 'c0ed51e4-9c8c-44fa-876f-03470ea2a777', while another blob may be named 'e3b66cfc-5322-4cdc-b6a2-71 dac93982cc'. Depending upon the requirement, the storage module 120 may also utilize other random names for the naming of the blobs. In one implementation, the storage module 120 may name the blobs based on a predefined naming convention. The predefined naming convention may include parameters, such as the blob name would include at least 32 characters where at least one numeral and two alphabets are utilized.

The random naming of blobs by the storage module 120 may also avoid any conflict in case of block level backups. In block level backups, associating a file name with its changed blocks may be misleading as each blob may represent some portion of data, and may not be an entire file itself. Therefore, random naming of each blob, representing a portion of data, may also avoid any conflict in block level backups.

The random names allocated to the blobs stored within the backup storage unit may also be mapped to actual file names for the purpose of non-staged recovery. In one implementation, the mapping module 122 may create a mapping between the files corresponding to data of each VM and the blobs stored onto the backup storage unit. Since the files corresponding to data of each VM are predefined, for the sake of explanation, these files have been referred to as predefined files of VM, hereinafter.

The mapping module 122, to create the mapping, may identify the predefined files corresponding to data of each VM, and may also identify blobs corresponding to such predefined files. In one example implementation of the present subject matter, the mapping module 122 may store the mapping between the predefined files and the blobs in mapping tables 130. In an example, if the storage module has backed-up 3 blobs corresponding to 3 predefined files, the mapping module 122 may create a mapping between them in a manner as shown in Table 1:

TABLE 1

| File 1 | → | Randomly Named Blob1 |
| File 2 | → | Randomly Named Blob 2 |
| File 3 | → | Randomly Named Blob 3 |

By utilizing mapping tables as described above, the mapping module 122 may associate the proper blob to a predefined file such that appropriate blobs can be provided to virtualization agents at the time of data recovery.

Although a simple and direct mapping between the predefined files and the blobs has been described, in one implementation, the mapping module 122 may also utilize other forms of mappings to accommodate hierarchical units, such that different permutations of VM configurations can be managed. For example, in a virtual environment, two VMs may be implemented where one VM may include its data within a one datastore while the other VM may include its data within a different datastore. In such situation, the mapping module 122 may create a mapping similar to one as depicted in Table 2:

TABLE 2

| Datastore 1\File 1 | → | Randomly Named Blob1 |
| Datastore 2\File 2 | → | Randomly Named Blob 2 |

Therefore, based on the mapping between the predefined files and the corresponding blobs, the virtualization agent may merely access the predefined files and recover corrupt/deleted files of a VM. The communication module 118, based on the mapping tables 130, may provide the entire VM backed-up data in the form of blobs to the virtualization agent for recovery. Accordingly, the backup host 102 may not have to stage the backed-up data first onto a temporary 'staging area', and the recovery of data and files can be directly performed by the virtualization agents by accessing the blobs from the backup storage unit.

In one implementation of the present subject matter, the storage module 120 of the backup host 102 may also secure the backed-up data against any tampering and unauthorized changes to maintain its integrity. Since the blobs are mapped to predefined files through the mapping tables 130, any change in the blobs, such as change of name, may render the mappings useless for future purpose, thereby causing a threat to security and integrity of data and its recovery. However, some virtualization agents, such as the vmware® may necessitate write access to the data of VMs for the purpose of recovery.

Accordingly, in an implementation, the storage module 120 may not provide direct write access to the backed-up blobs. The storage module 120 of the backup host 102 may create shared directory for virtualization agents which may include predefined files along with links to the blobs corresponding to these predefined files. In an example, the storage module 120 may create a Common Internet File System (CIFS) based shared directory for windows platform, and may create a SAMBA based shared directory for linux. It would be noted that the mapping table 130 may allow the storage module 120 to identify the blobs corresponding to the predefined files based on which, a link to such identified blobs may be stored by the storage module 120.

In operation, when the virtualization agents may attempt to recover VM's data by accessing the predefined files, they may be provided with the shared directories including the predefined files and links to the corresponding blobs. The links to the blobs may provide indirect access to the backed-up data to the virtualization agents, thereby providing security to the backed-up data. To this end, the virtualization agent may be provided with write permission to the shared directory, but with read-only permission to the links included therein. This may allow the virtualization agents to have write permissions to predefined files whereby integrity of the backed-up data in the form of blobs is also maintained. In one implementation of the present subject matter, the storage module 120 may create the shared directories for specific sessions with unique session IDs. This may also avoid any unauthorized access to the backed-up data and may allow write access to authorized users and for limited period of the session.

In an example, data of a VM, say $VM_1$ may be accessed by a virtualization agent through 3 predefined files. Therefore, the virtualization agent may access these 3 predefined files to access the backed-up data of $VM_1$. In such a scenario, the mapping module 122 may have created a mapping between the predefined files and the blobs stored with random names corresponding to these predefined files. Therefore, the storage module 120 may create a shared directory corresponding to the $VM_1$ that may include the 3 predefined files along with a link to the mapped blobs. Further, the storage module 120 may provide write access to the virtualization agent on the shared directory to access the data of the $VM_1$.

As described earlier, the backup storage unit may either be a local storage unit of the backup host 102, or may be an external storage unit connected to the backup host 102 through the communication network 106. It would be noted that the external storage may also be a network shared storage unit accessible to the backup host 102. In situations where the backup storage unit is a local storage unit, the storage module 120 may create hard-links within the shared directory to link blobs corresponding to the predefined files.

However, it would be noted that the generation and use of hard links may be limited to scenarios where the backup storage unit is a local storage unit. Use of hard-links in situations where the backup storage unit is a network shared storage unit, such as a NAS based CIFS or Network File System (NFS) may be constrained since entities providing NAS storage may not allow an already shared storage unit to be re-shared.

Therefore, in situations where the backup host 102 may utilize an external backup storage unit, shared through a network, such as the communication network 106, the storage module 120 may create local directories containing soft-links to the blobs corresponding to the predefined files. The soft-links may allow access to the blobs stored externally, but may allow local recovery of data by the virtualization agent. Hence, the integrity of the backed-up data may be maintained and a direct access to blobs may also be made available to the virtualization agents for 'non-staged' recovery of data.

Based on the implementation of the described techniques for backup of data of the virtual environments, a 'non-staged' granular recovery of data may be performed by the backup host 102.

In operation, for recovery of backed-up data, the backup host 102 may receive a request from the virtualization agent, requesting access to the predefined files corresponding to one or more VMs. The communication module 118 may identify the predefined files corresponding to the request and may communicate with the storage module 120 to share session information along with other details of the request.

The storage module 120 may create a shared directory, based on the information received from the communication module 118. The storage module 120 may identify the predefined files to be accessed for the purpose of recovery. Based on the identification of predefined files, the storage module 120 may also query the mapping tables 130 and determine the blobs to be linked to such predefined files.

Further, the storage module 120 may identify the type of backup storage unit utilized for the backup, such as local or external to the backup host 102, to determine the kind of links to be generated. Accordingly, the storage module 120 may either create a hard-link, or a soft-link for the blobs stored at the first location of the backup storage unit. Thereafter, the storage module 120 may create the shared directory including predefined files along with links to the associated blobs. In one implementation, the storage module 120 may also delete the created shared folders after completion of the recovery of data. In one example, the deletion of the shared directories may be based on session existence. That is, if the session for which the shared directory is created expires, the storage module 120 may delete the created shared folders.

In one implementation, the communication module 118 may then provide the location of the shared directory to the virtualization agent for accessing the backed-up data of the one or more VMs for recovery.

Figure 1B:
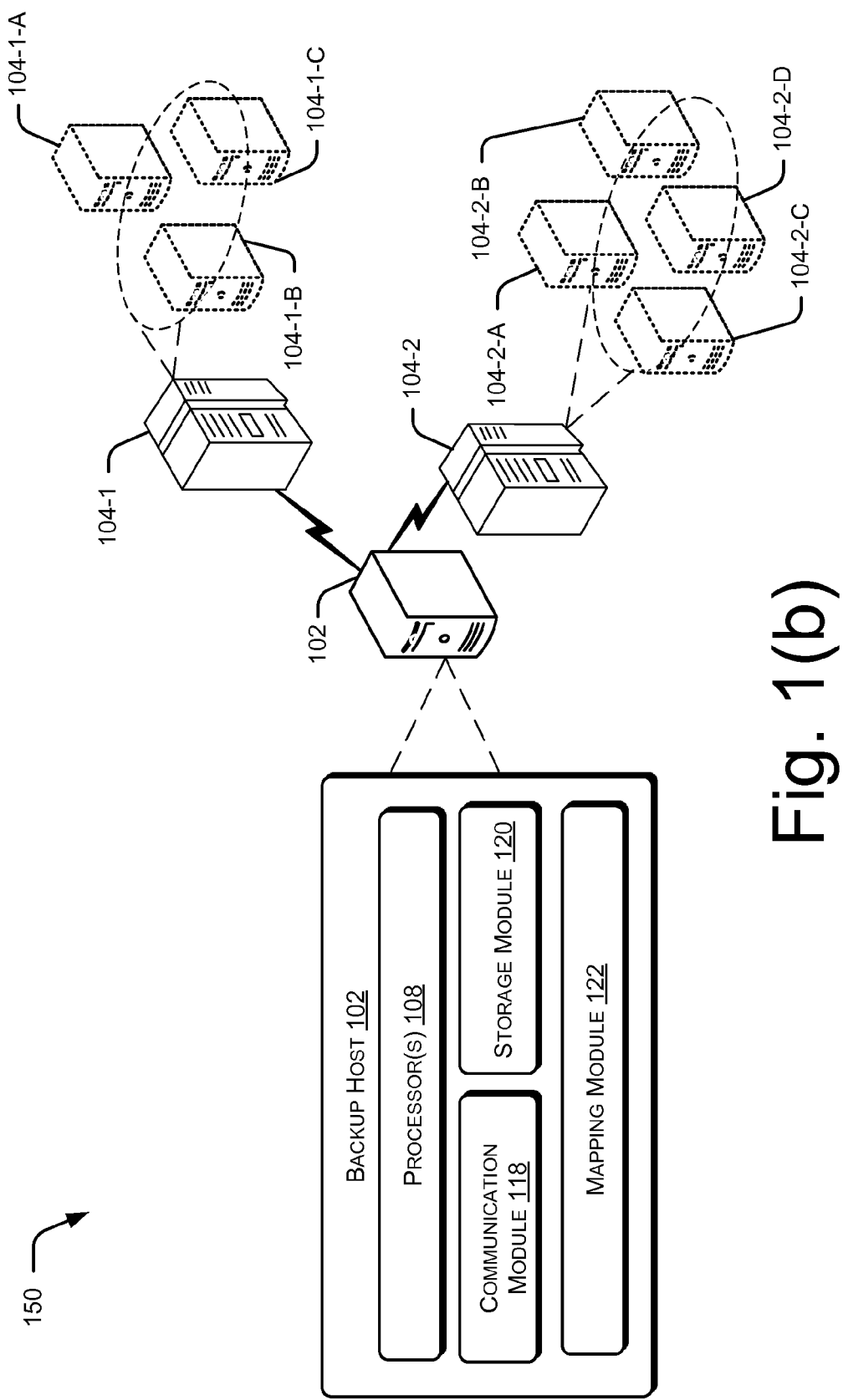
FIG. 1(b) illustrates another computing environment implementing the backup host for backup of virtual environment data, according to an example of the present subject matter

FIG. 1(b) schematically illustrates another computing environment 150, implementing the backup host 102, according to an example implementation of the present subject matter. The backup host 102 may be coupled to the computing hosts 104. Each computing host 104 may provide its individual virtual environment implementing one or more VMs. In the described example implementation, the communication hosts 104 may utilize vmware® as the virtualization agent for creating virtual environment with one or more VMs.

In operation, the vmware® through a backup agent or backup service may share data to be backed-up with the backup host 102. Accordingly, the backup agent or backup service may send predefined files to the backup host 102 through one or more data streams. In the described example, 4 predefined files may be received by the backup host 102 and may include scsi0-0.meta, vm1-flat.vmdk, vm1.vmdk and vm1.vmx.

The storage module 120 may store the received data, or the predefined files, onto the first storage location of the backup storage unit (not shown) of the backup host 102. Corresponding to the 4 predefined files received, the storage module 120 may also generate metadata and store it onto the second location of the backup storage unit.

In the described scenario, corresponding to the 4 predefined files, the storage module 120 may also store actual data as 4 different blobs at the first location and provide them with random names of 32 characters each. For instance, the blobs may be named as c0ed51e4-9c8c-44fa-876f-03470ea2a777, e3b66cfc-5322-4cdc-b6a2-71dac93982cc, 90536ad5-4ffc-4099-a4c5-f206817231ca, and 0941ac86-4358-4131-8901-ec179ea7f734.

To map the stored blobs with the predefined files, the mapping module 122 may create a mapping table where a mapping between each of the predefined file and its corresponding blob may be defined. In the present example, the mapping module may define a mapping table as per Table 3 shown below:

TABLE 3

| scsi0-0.meta | → | c0ed51e4-9c8c-44fa-876f-03470ea2a777 |
| vm1-flat.vmdk | → | e3b66cfc-5322-4cdc-b6a2-71dac93982cc |
| vm1.vmdk | → | 90536ad5-4ffc-4099-a4c5-f206817231ca |
| vm1.vmx | → | 0941ac86-4358-4131-8901-ec179ea7f734 |

Therefore, based on the storage of backed-up data as randomized blobs, the backup host 102 may allow non-staged recovery of data. The backup host 102 may provide recovery of backed-up data in manner similar to that as explained in FIG. 1(a), and therefore, the explanation has been omitted here for the sake of brevity.

Figure 2:
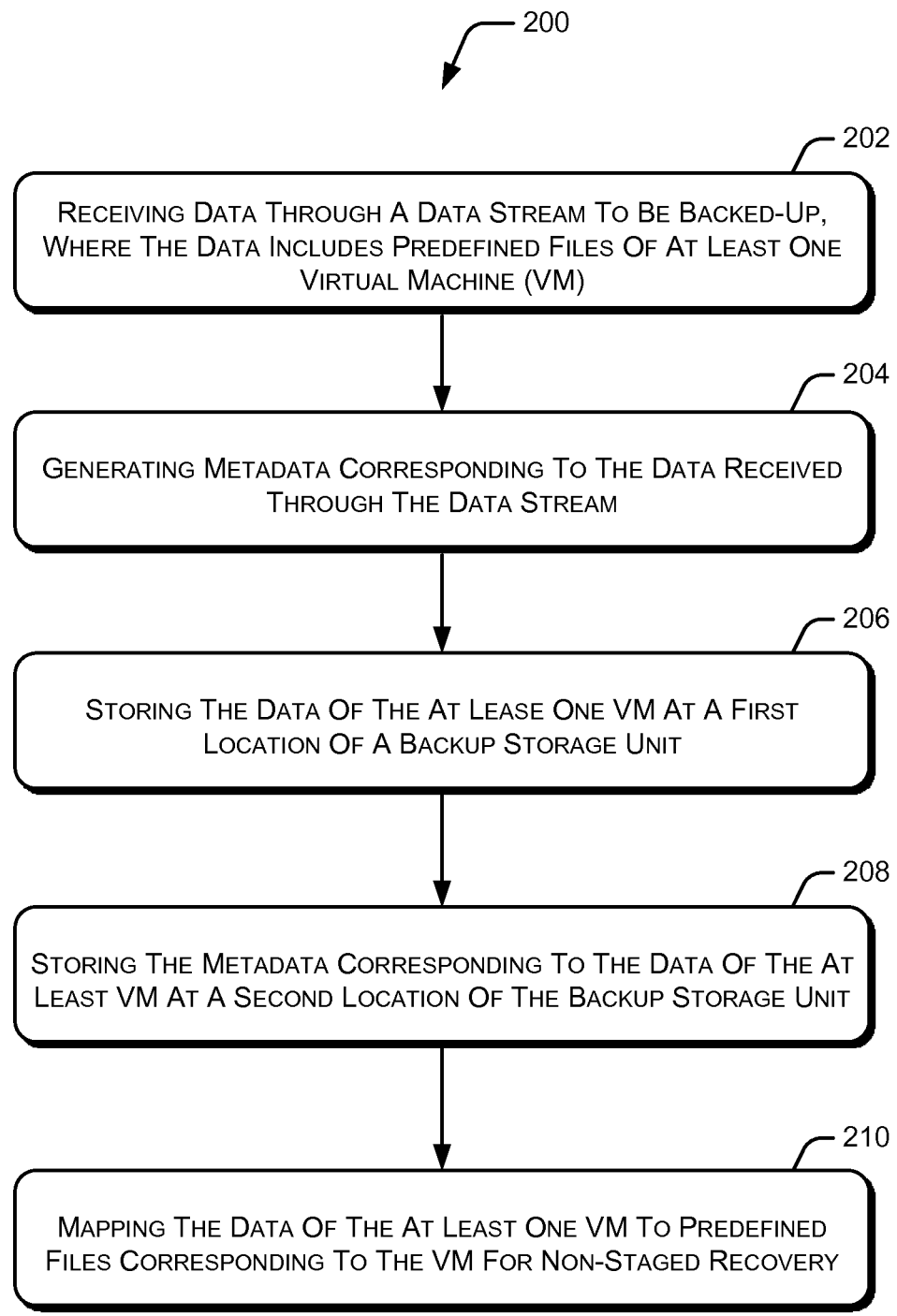
FIG. 2 illustrates a method for storing data of virtual environments for backup and non-staged recovery, according to an example of the present subject matter.

FIG. 2 illustrates a method 200 of backup of virtual environments, according to an implementation of the present subject matter. The order in which the method 200 is described is not intended to be construed as a limitation, and any number of the described method blocks may be combined in any order to implement the method 200, or an alternative method. Furthermore, the method 200 may be implemented by processor(s) or computing device(s) through any suitable hardware, non-transitory machine readable instructions, or combination thereof.

It may be understood that steps of the method 200 may be performed by programmed computing devices. The steps of the method 200 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media.

Further, although the method 200 may be implemented in a variety of backup hosts; in an implementation described in FIG. 2, the method 200 is explained in context of the aforementioned backup host 102, for ease of explanation.

Referring to FIG. 2, in an example implementation of the present subject matter, at block 202, data to be backed-up onto a backup storage unit is received. In one implementation, the data may correspond to one or more VMs where data of each VM may be included as predefined files. Therefore, the received data may include one or more predefined files and may be received through data streams. The predefined files can be understood as files utilized by a virtualization agent to access data of a VM.

At block 204, metadata corresponding to the data may be generated. The metadata can be understood as data representing information about the data received for backup through the data streams. In an example, the metadata may include, but not limited to, descriptors related to the data, references about the data, file sizes of the data, checksum of the data, disk information corresponding to the data, and time of backup of the data.

At block 206, the data of the at least one VM may be stored at a first location of a backup storage unit. The data may be stored as binary copies (blobs) of source files. In one implementation, the first location may either be a predefined path within the backup storage unit, or may be a predefined folder within the backup storage unit. Further, the backup storage unit may either be local to the backup host 102, or may be external to the backup host 102. It would be noted that the external storage may also be a network shared storage unit accessible to the backup host 102.

At block 208, the metadata generated corresponding to the received data may be stored at a second location of the backup storage unit. In one implementation of the present subject matter, the second location may be different from the first location and may be a different path or folder than that utilized for the storage of the data at the first location.

At block 210, the data of the at least one VM, as blobs, may be mapped to the predefined files. In one implementation, the stored blobs may be randomly named to avoid any name conflict, and to maintain integrity of the backed-up data. Therefore, to maintain a correspondence between the predefined files and the randomly named blobs, the mapping may be generated.

Figure 3:
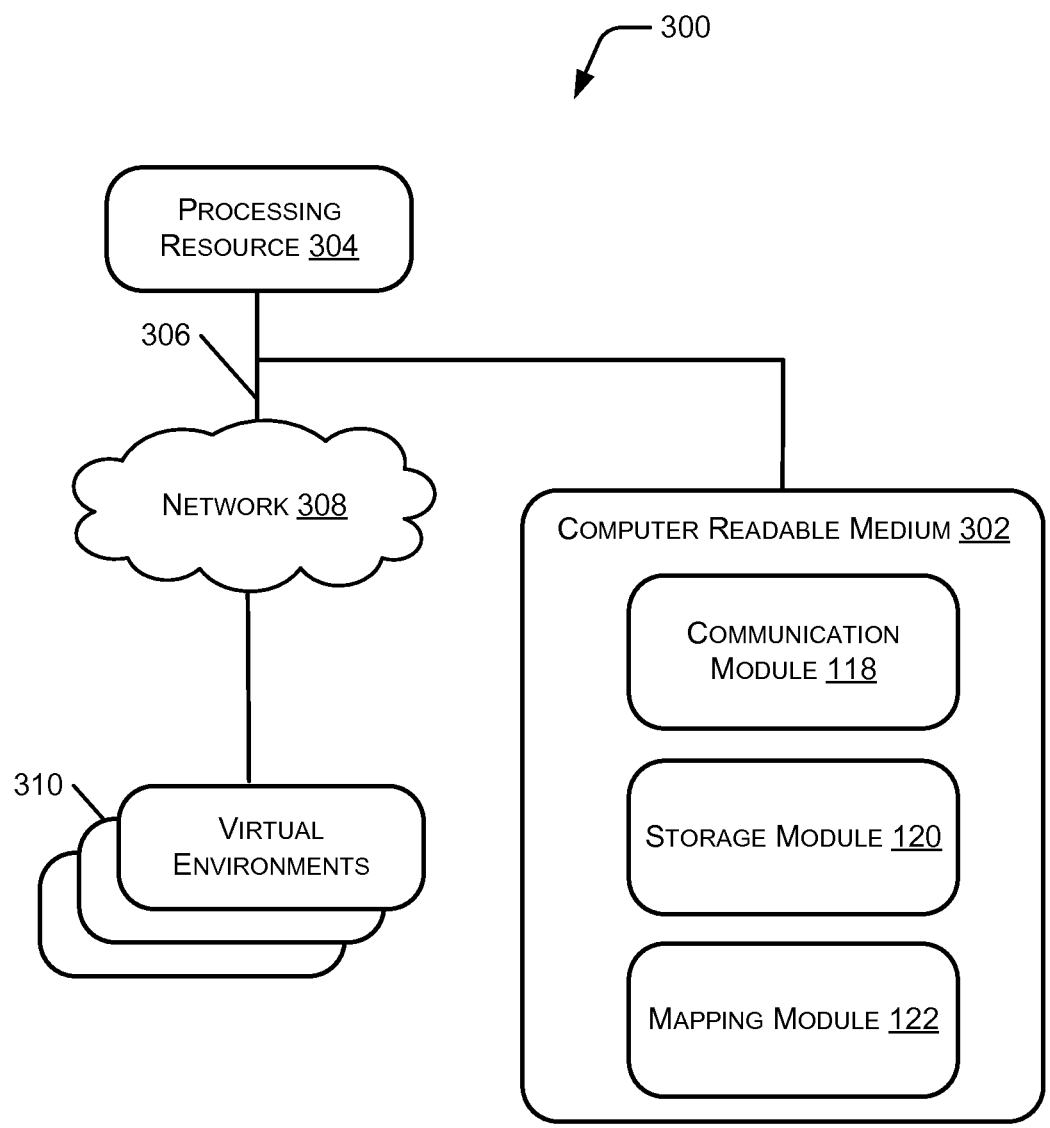
FIG. 3 illustrates an example computing environment, implementing a non-transitory computer-readable medium for storing data of virtual environments for backup and non-staged recovery, according to an example of the present subject matter.

FIG. 3 illustrates a computing environment 300, implementing a non-transitory computer-readable medium 302, according to an implementation of the present subject matter. In one implementation, the non-transitory computer readable medium 302 may be utilized by a computing device, such as the backup host 102 (not shown). The backup host 102 may be implemented in a public networking environment or a private networking environment. In one implementation, the computing environment 300 may include a processing resource 304 communicatively coupled to the non-transitory computer readable medium 302 through a communication link 306.

For example, the processing resource 304 may be implemented in a computing device, such as the backup host 102 described earlier. The computer readable medium 302 may be, for example, an internal memory device or an external memory device. In one implementation, the communication link 306 may be a direct communication link, such as any memory read/write interface. In another implementation, the communication link 306 may be an indirect communication link, such as a network interface. In such a case, the processing resource 304 may access the computer readable medium 302 through a network 308. The network 308 may be a single network or a combination of multiple networks and may use a variety of different communication protocols.

The processing resource 304 and the computer readable medium 302 may also be communicating with virtual environments 310 over the network 308. The virtual environment 310 may include, for example, one or more VMs operating on different platforms to provide numerous functionalities. The virtual environments 310 may include virtualization agents that communicate with the processing resource 304, in accordance with the present subject matter.

In one implementation, the computer readable medium 302 includes a set of computer readable instructions, such as the communication module 118, the storage module 120, and the mapping module 122. The set of computer readable instructions may be accessed by the processing resource 304 through the communication link 306 and subsequently executed to process data communicated with the virtual environments 310.

For example, the communication module 118 may receive and provide data to the virtual environments 310 through data streams. Each virtual environment 310 may include one or more VMs where data of each VM may be accessed by the virtualization agents through one or more predefined files. Accordingly, for the purpose of backup of data of the VMs, the virtualization agents may share the predefined files with the processing resource 304.

The data received by the communication module 118 may be stored by the storage module 120. The storage module 120 may store the received data, or the predefined files, onto a first storage location of the backup storage unit (not shown). The data may be stored as binary copies of source files. Since the data being stored by the storage module 120 includes multiple files and the data is stored as binary copies of source files, each file within the data is also stored blobs.

The storage module 120 may also allocate random names to the blobs while storing them onto the first location of the backup storage unit. The random naming of the blobs may be based on a predefined naming convention, such as the name would include at least 32 characters where at least one numeral and two alphabets are utilized, and the like.

The storage module 120, according to an implementation of the present subject matter, may also generate metadata corresponding to the data received. The metadata may include information about the data which may be utilized by the backup host 102 for various purposes like identification of data size, accessing data backup date, identifying users authorized to access the data, and the like.

In one implementation, the storage module 120 may store the metadata at a second location of the backup storage unit. The second location may be different from the first location and the metadata may not be interleaved with the actual data such that the actual data can be access directly without having to be staged and separated from its metadata.

Since the storage of blobs may be done with random names, the mapping module 122 may create a mapping between the predefined files and the stored blobs. This may allow identification of blobs corresponding to each predefined file even when the name of each blob is defined randomly.

In one implementation, the virtualization agents may access the stored blobs by accessing the predefined files. To this end, a link between the predefined file names and the actual blobs may be created based on the mapping, and may be stored in a shared directory. The shared directory may include either hard-links or soft-links to the blobs which correspond to the predefined file names such that the virtualization agents can have access to the blobs which include actual backed-up data.

Although implementations of backup hosts creating backups of virtual environments to allow non-staged granular recovery of data and files have been described in language specific to structural features and/or methods, it is to be understood that the present subject matter is not necessarily limited to the specific features or methods described. Rather, the specific features and methods are disclosed and explained in the context of a few implementations for backup hosts.

What is claimed is:

1. A method for creating backup of data of a virtual environment to allow non-staged recovery, the method comprising:
   receiving the data of the virtual environment through one or more data streams for backup, wherein the data includes at least one predefined file of at least one virtual machine (VM);
   generating metadata corresponding to the received data, wherein the metadata is indicative of properties of the received data;
   storing the received data as binary large objects (blobs) at a first location of a backup storage unit, storing the received data comprising randomly naming the blobs based on a predefined naming length;
   storing the generated metadata at a second location of the backup storage unit, wherein the second location is different from the first location of the backup storage unit; and
   mapping the at least one predefined file to the stored data to create a mapping table which allows direct access to the stored data for non-staged recovery.

2. The method as claimed in claim 1, wherein:
   the method further comprises generating a shared directory for recovery of the stored data; and
   the shared directory includes the at least one predefined file and a link between the at least one predefined file and the stored data.

3. The method as claimed in claim 2, wherein the link between the at least one predefined file and the stored data is one of a hard-link and a soft-link, wherein the link is based on type of the backup storage unit, and wherein the type of the backup storage unit is one of a local storage unit and an external storage unit.

4. The method as claimed in claim 1, wherein the storing the received data at a first location of the backup storage unit comprises:
   generating at least one file corresponding to the received data, wherein the received data correspond to changed blocks, and wherein the received data includes changed blocks and associated mapping information; and
   creating metadata corresponding to the at least one file based on the changed blocks and associated mapping information.

5. The method as claimed in claim 1, wherein the method further comprises:
   receiving, from a computing host, a request to recover the stored data, wherein the request is indicative of access to at least one predefined file backed-up onto a backup storage unit;
   creating a shared directory for access by the computing host, wherein the shared directory includes the at least one predefined file; and
   associating each of the at least one predefined file with a link to a corresponding blob, wherein the link is one of a hard-link and a soft-link.

6. The method as claimed in claim 1, wherein the metadata includes at least one of file sizes of the received data, checksum of the received data, disk information corresponding to the received data, and time of backup of the received data.

7. The method as claimed in claim 1, wherein direct access to the stored data is read-only direct access.

8. The method as claimed in claim 1, comprising:
determining whether the backup storage unit is a local storage unit or an external storage unit;
generating a soft-link between the at least one predefined file and the stored data in response to determining that the backup storage unit is an external storage unit; and
generating a hard-link between the at least one predefined file and the stored data in response to determining that the backup storage unit is a local storage unit.

9. The method of claim 1, wherein:
storing the received data as blobs at a first location of a backup storage unit comprises storing the received data as blobs in a first folder on the backup storage unit; and
storing the generated metadata at a second location of the backup storage unit comprises storing the generated metadata in a second folder on the backup storage unit, the first folder and the second folder being different folders.

10. A backup host for providing non-staged recovery of backed-up data of a virtual environment, the backup host comprising:
a processor;
a communication module coupled to the processor to:
receive, from a computing host, a request to restore stored data of the virtual environment:
based on the request, identify a predefined file corresponding to the stored data; and
a storage module coupled to the processor to:
based on a mapping table, determine a binary large object (blob) stored as backup in a first location of a backup storage unit, the blob corresponding to the predefined file;
determine whether the backup storage unit is a local storage unit or an external storage unit;
generate a soft-link between the predefined file and the blob in response to determining that the backup storage unit is an external storage unit;
generate a hard-link between the predefined file and the blob in response to determining that the backup storage unit is a local storage unit; and
create a shared directory for access by the computing host, wherein the shared directory includes the at least one predefined file and the generated hard-link or the generated soft-link.

11. The backup host as claimed in claim 10, wherein the communication module provides the shared directory to the computing host for recovery of the backed-up data of the virtual environment.

12. The backup host as claimed in claim 10, wherein the storage module stores the blob at the first location of the backup storage unit with random names based on a predefined naming length.

13. The backup host as claimed in claim 10, wherein the storage module is to:
delete the shared directory in response to determining that the request to restore stored data of the virtual environment is completed.

14. The backup host as claimed in claim 10, wherein the storage module is to:
delete the shared directory in response to determining that a session associated with the shared directory has expired.

15. The backup host as claimed in claim 10, wherein the communication module is to:
provide a location of the shared directory to the computing host for recovery of the backed-up data of the virtual environment.

16. A non-transitory computer-readable medium comprising instructions for a backup host to communicate in a computing environment that, when executed by a processor, cause the processor to:
receive data of a virtual environment through one or more data streams for backup, wherein the data includes at least one predefined file of at least one virtual machine;
generate metadata corresponding to the received data, wherein the metadata is indicative of properties of the data;
store the received data as binary large objects (blobs) at a first location of a backup storage unit, storing the received data comprising randomly naming the blobs based on a predefined naming length, wherein type of the backup storage unit is one of a local storage unit and an external storage unit;
store the generated metadata at a second location of the backup storage unit, wherein the second location is different from the first location of the backup storage unit; and
map the at least one predefined file to the stored received data to create a mapping table which allows direct access to the stored data for non-staged recovery, the mapping table being different from the generated metadata.

17. The non-transitory computer-readable medium as claimed in claim 16, wherein the instructions cause the processor to:
receive, from a computing host, a request to recover data of the virtual environment, wherein the request is indicative of access to at least one predefined file backed-up onto a backup storage unit;
create a shared directory for access by the computing host, wherein the shared directory includes the at least one predefined file; and
associate each of the at least one predefined file with a link to a corresponding blob, wherein the link is one of a hard-link and a soft-link.

18. The non-transitory computer-readable medium of claim 16, wherein direct access to the stored data is read-only direct access.

19. The non-transitory computer-readable medium as claimed in claim 16, wherein the generated metadata includes at least one of file sizes of the received data, checksum of the received data, disk information corresponding to the received data, and time of backup of the received data.

20. The non-transitory computer-readable medium of claim 16, wherein:
the first location of the backup storage unit comprises a first folder on the backup storage unit; and
the second location of the backup storage unit comprises a second folder on the backup storage unit, the first folder and the second folder being different folders.

* * * * *